United States Patent
Bentley et al.

(10) Patent No.: US 6,613,831 B1
(45) Date of Patent: Sep. 2, 2003

(54) COLD SEALABLE ADHESIVE

(75) Inventors: Christine Bentley, Thurgarton (GB); Brian William Stephenson, Newark (GB)

(73) Assignee: Sovereign Holdings, LLC (GB)

( * ) Notice: Subject to any disclaimer, the term of this patent is extended or adjusted under 35 U.S.C. 154(b) by 28 days.

(21) Appl. No.: 09/631,816

(22) Filed: Aug. 3, 2000

(30) Foreign Application Priority Data

Aug. 3, 1999 (GB) ............................................... 9918291

(51) Int. Cl.$^7$ ................................................. C08K 3/20
(52) U.S. Cl. ........................ 524/501; 524/519; 524/522; 524/523; 524/524; 524/525; 524/526
(58) Field of Search ................................. 524/501, 519, 524/522, 523, 524, 525, 526

(56) References Cited

U.S. PATENT DOCUMENTS

| | | | | |
|---|---|---|---|---|
| 3,976,609 A | * | 8/1976 | Schnoring | 260/17 |
| 4,994,267 A | | 2/1991 | Sablotsky | |
| 5,294,663 A | * | 3/1994 | Fabris | 524/526 |
| 5,804,636 A | * | 9/1998 | Nahmias | 524/492 |

FOREIGN PATENT DOCUMENTS

| EP | 0747442 | 12/1996 |
|---|---|---|
| WO | 99/65998 | 12/1999 |

OTHER PUBLICATIONS

Riyouji, et al., "Adhesive for Plywood of Sliced Veneer", JP 581183772, (Oct. 27, 1983) Abstract Only.
Sonoko, et al., "Adhesive for False Hairs", JP 57092073, (Jun. 8, 1982) Abstract Only.
Akira, Seki, "Vinyl Acetate Adhesive". Publication No. 56000869, (Jan. 7, 1981), Abstract Only.
Shin, Konishl, "Aqueous Polyurethane Emulsion Composition, and Water–Based Emulsion Coating Material and Adhesive Prepared by Using the Same", Publication No. 10273587, (Oct. 13, 1998), Abstract Only.
European Search Report, EP 00 30 6618, Nov. 30, 2000.
International Search Report, GB 0019108.0, Dec. 15, 2000.
Kraton IR–305 Elastomer Data Document, Apr. 2000, pp 1–4.
Kraton IR–310 Elastomer Data Document, Apr. 2000, pp 1–4.
Shinji, et al., "Method of Peeling Protective Film", JP 10053746, (Feb. 24, 1998), Abastract Only.
Kargin, et al., "Water–Soluble Glue for Concrete", SU 1691381, (Nov. 15, 1991) Abstract Only.

* cited by examiner

*Primary Examiner*—Edward J. Cain
(74) *Attorney, Agent, or Firm*—Harness, Dickey & Pierce, P.L.C.

(57) ABSTRACT

The invention relates to the use of synthetic cis-1,4-polyisoprene as a cold sealable adhesive. A layer 14 of the cold sealable adhesive may be applied to substrates 10 and 12 which may then be bonded when the layers 14 are brought into contact.

27 Claims, 1 Drawing Sheet

COLD SEALABLE ADHESIVE

BACKGROUND OF THE INVENTION

The present invention relates to a cold sealable adhesive and more particularly relates to a cold sealable adhesive containing synthetic latexes.

Cold sealable adhesives form a class of adhesives which work by forming an adhesive-adhesive bond without the need for the application of heat. In the art, this is often referred to as an A-A seal. Thus in order to bond two substrates, a layer of the cold sealable adhesive is applied to both the substrates, then the substrates are brought together under pressure in a manner such that the layers of adhesive are nipped together. Cold sealable adhesives differ from pressure sensitive adhesives, where two substrates are bonded by coating only one of the substrates with adhesive, then bringing the substrates together. In the art, this is often referred to as an A-B seal.

Plastic, foil and paper packaging structures are used in the food packaging, medical and industrial packaging industries for the wrapping and protection of the vast majority of foodstuffs, medical articles, and for the protection of general goods such as books and cassettes These structures may be mono webs or laminates of different plastics, plastics and metal foils, or plastics and paper. Materials are wrapped in the structures and these are subsequently sealed either by welding with heat and pressure, or via a heat seal adhesive with heat and pressure or by the application of pressure alone. Non woven materials are used in the manufacture of bandages for example for field dressings where the bandage is wrapped around the wound and then sealed or fastened by the application of pressure alone.

The wrapping of confectionery, biscuits, cakes and ice cream is a special case in the field of food packaging in that preferably the sealing process is carried out at ambient temperature. This allows for significant increases in line speeds thus providing for more economical production. In addition it serves to prevent damage to products (particularly chocolate based products) during the wrapping process, especially in the event of a line breakdown when materials may be left standing for some time.

Traditionally such cold sealing adhesives are water based and derived from natural rubber latex coupled with a synthetic polymer which is usually acrylate based. The latex is primarily a dispersion of cis-1,4-polyisoprene which is stabilised with a natural water soluble protein fraction.

Cis-1,4-polyisoprene has the following structure:

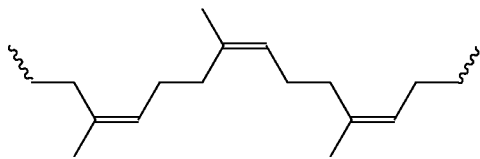

Natural rubber latex exhibits several unique properties that make it suitable for use in such cold sealing adhesives. More specifically, it readily seals to itself but does not produce a tacky film and hence will not block when reeled up to the opposite surface.

To date, synthetic cold sealing adhesives have usually been based on pressure sensitive technology utilising acrylic polymers. The main drawback with this approach has been the tacky nature of the adhesive films produced and subsequent blocking in the reels and noise produced when the converted film is unwound at the packing station

SUMMARY OF THE INVENTION

This present invention relates to the use of synthetic latexes for the production of an adhesive which may be applied to plastic, paper, foil, coated films, or non woven substrates, and subsequently dried producing a tack free film. At a later date the adhesive film may be used to produce a bond by sealing the adhesive film to itself by pressure alone.

The present invention provides an entirely synthetic solution to the problems in the prior art. Specifically, it is an aim of the present invention to provide a cold sealable adhesive which contains mostly synthetic products, and which preferably consists entirely of synthetic products, but which does not have the tackiness problems associated with the synthetic adhesives based on acrylic polymers. Thus, the adhesive provided by the present invention will seal to itself with the application of pressure in the absence of heat The adhesive will also provide a tack free film which will not block when wound up or produce unacceptable noise whilst being unwound from a release lacquer or homopolymer untreated film. In addition, the adhesive will wet out and adhere to a number of substrates including plastics, coated plastics, paper type films, and non wovens, and is capable of being applied on a high speed printing press.

We have found that the use of synthetic cis-1,4-polyisoprene as a cold seal adhesive solves many, if not all, of the problems in the prior art. In addition, we have found that the use of synthetic cis-1,4-polyisoprene as a cold seal adhesive provides an unexpectedly improved seal strength over the natural product, and provides better printability than the natural product.

According to one aspect of the invention we provide a cold sealable adhesive which comprises synthetic cis-1,4-polyisoprene, and which does not contain any natural cis-1,4-polyisoprene. Thus, the adhesive comprises man-made cis-1,4-polyisoprene, and does not contain any such material derived from a naturally occurring source, such as a rubber tree.

The synthetic cis-1,4-polyisoprene used in the present invention is obtained by a synthetic manufacturing process, i.e., it is not obtained by treatment of or isolation from natural rubber latex.

According to another aspect of the invention there is provided the use of synthetic cis-1,4-polyisoprene as a cold sealable adhesive. Advantageously, the synthetic cis-1,4-polyisoprene is provided in the form of a dispersion in water.

According to another aspect of the invention there is provided a method of sealing two substrates together comprising the steps of: coating each substrate with a layer of a cold sealable adhesive comprising synthetic cis-1,4-polyisoprene; and bringing the adhesive layers of each substrate into contact to adhere the substrates together. More preferably the cold sealable adhesive comprises a cold sealable adhesive composition as described above. In general, pressure would be applied to assist the bonding of the substrates.

According to another aspect of the invention there is provided a method of sealing two parts of a substrate together, comprising the steps of: coating both parts of the substrate with a respective layer of a cold sealable adhesive comprising synthetic cis-1,4-polyisoprene; and bringing the adhesive layers of each part of the substrate into contact to adhere the parts of the substrate together. More preferably the cold sealable adhesive comprises a cold sealable adhesive composition as described above. In general, pressure would be applied to assist the bonding of the parts of the substrate.

BRIEF DESCRIPTION OF THE DRAWINGS

Reference is now made to the accompanying drawings, in which.

DESCRIPTION OF THE PREFERRED EMBODIMENTS

Figure 1:
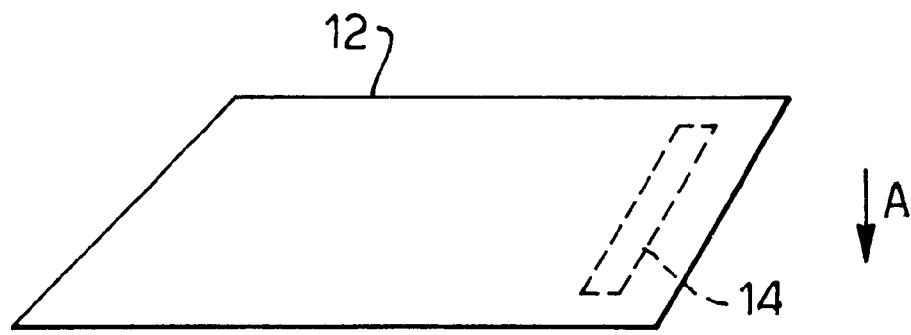
FIG. 1 is a perspective view of one embodiment of the invention.

It is especially advantageous that the synthetic cis-1,4-polyisoprene is provided as an emulsion of synthetic cis-1,4-polyisoprene in water. The amount of synthetic cis-1,4-polyisoprene in the emulsion is preferably from 50 to 75 wt %. It is more preferred that the amount of synthetic cis-1,4-polyisoprene in the emulsion is from 60 to 70 wt %, most preferably from 60 to 67 wt %.

It is especially preferred that the synthetic cis-1,4-polyisoprene is made in accordance with the technique described in U.S. Pat. No. 3,215,649, the contents of which are incorporated herein by reference. The technique described in this patent specification involves manufacturing the synthetic rubber using a Li-alkyl catalyst. Synthetic cis-1,4-polyisoprene made by this technique is characterised by being able to form a dispersion in water and by having a relatively high molecular weight in comparison with synthetic cis-1,4-polyisoprene made by other techniques. It also has a zero gel content and essentially no branching.

The limiting viscosity number of the synthetic cis-1,4-polyisoprene, as measured by Shell's method SMS 2195, is preferably in the range 6.5 to 9.0 dl/g. The Mooney viscosity of the synthetic cis-1,4-polyisoprene, as measured by ASTM D1646, is preferably in the range 70 to 80 MU, more preferably 75 to 77 MU, and most preferably 76 MU.

The synthetic cis-1,4-polyisoprene used in the present invention is less variable in its properties than its natural rubber counterpart, it has a narrower molecular weight distribution, and it is less branched. The adhesive formulation according to the invention does not need to contain any protein fraction, which means that there is a reduced danger of anaphylactic shock—this is an important consideration in the food industry. In addition, the synthetic product has little or no odour compared with the natural product, which is another particular advantage for the food industry. Furthermore, the adhesive formulation according to the present invention has better sealing characteristics, and better printability than adhesives based on natural rubber latex.

We prefer that the synthetic cis-1,4-polyisoprene used in the invention has a molecular weight (as measured by GPC) above 1,000,000, and more typically in the range 2,000,000 to 3,000,000 grams/mole. Preferably, the synthetic cis-1,4-polyisoprene has a substantially zero gel content. Preferably also the synthetic cis-1,4-polyisoprene has a narrow molecular weight distribution. The synthetic cis-1,4-polyisoprene may be formulated with an amount of synthetic trans-1,4-polyisoprene and of the 3,4 isomer. A typical formulation would comprise:

over 90 wt % synthetic cis-1,4-polyisoprene, for example 92 wt %;

under 2 wt % synthetic trans-1,4-polyisoprene, for example 1.5 wt %;

under 8 wt % 3,4 isomer, for example 6.5 wt %.

A suitable synthetic cis-1,4-polyisoprene (which contains about 1.5 wt % synthetic trans-1,4-polyisoprene and about 6.5 wt % of the 3,4 isomer) is available from Shell Chemicals of Rotterdam, Netherlands as Kraton IR latex. An especially suitable formulation is available under the trade name Kraton IR401.

Although the synthetic cis-1,4-polyisoprene emulsion may comprise from 20 wt % to 100 wt % of the adhesive formulation, it preferably comprises from 40 wt % to 100%, more preferably from 60 wt % to 100 wt %. In addition, although a cold seal adhesive can be formulated using synthetic cis-1,4-polyisoprene alone, it is highly desirable for the formulation to include at least 1 wt %, more preferably at least 5 wt % of a further synthetic polymer. Thus, according to another aspect of the invention there is provided a composition for use as a cold sealable adhesive, comprising 20 wt % to 99 wt %, preferably 20 wt % to 95 wt % of an emulsion of synthetic cis-1,4-polyisoprene in water in combination with 1 wt % to 80 wt %, preferably 5 wt % to 80 wt % of a further synthetic polymer, the further synthetic polymer being selected such that the composition has improved adhesion to polymer films and has improved block resistance in comparison with a film not including said further synthetic polymer.

The further synthetic polymer is provided in the form of an emulsion of the polymer in water, and the above weight percentages refer to the weight of the emulsion. Typically, the polymer in water emulsion would contain from 40 wt % to 70 wt % of the polymer, preferably from 50 wt % to 55 wt % of the polymer.

The further synthetic polymer may, in general, be any of the types of polymer normally used in cold sealable adhesives to improve the adhesion to polymer films (particularly polyolefin films) and to improve the block resistance. These polymers help to ensure that the composition can adhere adequatety to the substrate, and does not block to other materials, except for another layer of the composition applied either to another substrate or to a different part of the same substrate.

Preferably the further synthetic polymer is one or more polymers of the type based on acrylic monomers, vinyl acetate monomers, copolymers of acrylics, copolymers containing vinyl acetate, chlorinated rubbers or other polymer dispersions known to the adhesive formulator for use in cold seal adhesives to improve adhesion to polyolefin based films. Copolymers of vinyl acetate with an olefin, especially ethylene, are particularly suitable; however, soft styrene acrylates are suitable for some formulations. Butylacrylates are particularly preferred, as are chlorinated butadiene rubbers.

The composition may further include an amount of styrene-butadiene and/or styrene-isoprene rubber in addition to the synthetic cis-1,4-polyisoprene and the further synthetic polymer. These further rubbers are preferably provided in the form of a dispersion of rubber in water.

The glass transition temperature of the further synthetic polymer (or polymers) may vary from –20° C. to +20° C., preferably from -10° C. to +10° C., more preferably from –10° C. to +5° C.

The amount of the further synthetic polymer is preferably from 0 wt % up to about 60 wt %. However, we have found that the best results will be achieved with an amount of further synthetic polymer from 20 wt % to 40 wt % of the formulation. In general, the further synthetic polymer is provided as an emulsion of the polymer in water, and these percentages refer to the total weight of the emulsion.

In some embodiments, it is desirable to add a tackifying resin dispersion to enhance self sealing characteristics. These resins may be of the hydrocarbon, rosin, terpene, terpene phenolic types or other such tackifying resin dispersions known to those skilled in the art. When used, it is preferred that the amount of tackifying resin is up to 30 wt % of the formulation, more preferably from 1 wt % to 30 wt % of the formulation, and most preferably from 5 wt % to 10 wt % of the formulation. Obviously, when the tackifying resin is used, the amount of the synthetic cis-1,4-polyisoprene, and/or any further synthetic polymer, must be proportionately adjusted downwardly.

In addition, it is desirable to add processing aids to ensure smooth application on high speed presses. These aids take the usual form of antifoams, wetting agents, and stabilisers known to those skilled in the art of adhesive formulation. Furthermore the inclusion of antioxidants and biocides to protect the adhesive are also desirable.

A preferred stabiliser comprises a non-ionic surfactant, such as nonyl phenyl ethoxylate having from 30 to 70 moles ethylene oxide. Preferably the amount of stabiliser is below about 0.3 wt % of the formulation, for example about 0.25 wt %. Preferably also, the formulation includes at least 0.05 wt % stabiliser.

We have found that the formulation of cold seal adhesives with synthetic cis-1,4-polyisoprene is different in some aspects to the formulation of these adhesives with natural rubber latex. For example, optimum properties are achieved with softer polymers such as those of the vinyl acetate ethylene type as opposed to the harder polymers of the styrene acrylate type predominantly used in cold seals based on natural rubber latex. Furthermore, with the synthetic cis-1,4-polyisoprene, less stabilising agent is required to produce homogeneity between the rubber latex and the synthetic polymer and to provide on press stability—with natural rubber it is usually necessary to provide at least about 0.5 wt % stabiliser. This is an advantage to the adhesive formulator who is always trying to reduce the amount of these types of compounds as they can detract from the overall adhesive properties.

For the purpose of its commercial application, the adhesive formulations according to the invention may should be applied by high speed printing press usually by the forward gravure method. In a modern converting house these are normally multi station presses in which inks and lacquers are also printed to plastic, foil or paper substrates. The adhesive can be applied directly to the substrate in sufficient amount to give a dry coat weight of at least 2.5 g/m$^2$. The web can then be passed through a drying tunnel normally zoned with increasing increments of temperature towards the end of the tunnel. Once the adhesive is dried the converted film can be reeled up such that the adhesive is wound against a release lacquer usually applied at a previous station on the press, or against an untreated homopolymer film. As previously mentioned it is important that no blocking occurs in the reel after wind up and during storage. It is therefore important to check the compatibility of the cold seal adhesive and printed surface before commercial production.

Once converted the integrity of the bond may be tested by sealing the structure at ambient temperature at a pressure of around 40 psi (276 kPa) and dwell time of 0.5 s. The bond thus produced may be tested by pulling the joint apart in the jaws of a tensometer such as an Instron at a jaw separation rate of 300 mm/min and peel angle of 900. Bond strengths of greater than 3 N/25 mm should be achieved with in some cases film destruction.

In addition to the bond integrity residual odour and taint of the product may be investigated to ensure that adequate drying has taken place in the converting process.

Referring now to the drawings, In FIG. 1 two substrates 10 and 12 have each been provided with a layers 14 of a cold sealable adhesive according to the invention. The substrates 10 and 12 are brought together, as indicated by the arrows A, such that the layers 14 come into contact with one another and pressure is applied in order to bond the substrates 10 and 12 together.

Figure 2:
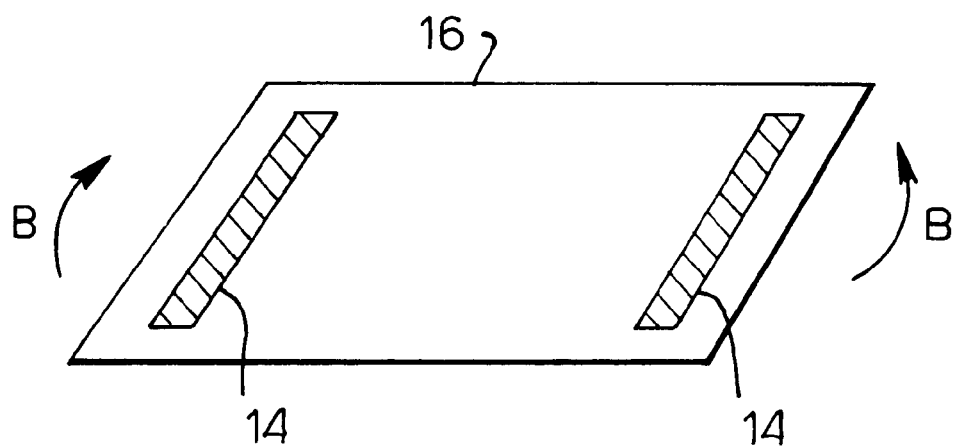
FIG. 2 is a perspective view of another embodiment of the invention.

In FIG. 2 a single substrate 16 has been provide with two spaced layers of the cold sealable adhesive 14. The substrate 16 is folded, as indicated by the arrows A, such that the layers 14 come into contact with one another and pressure is applied in order to bond the substrate 16 to itself.

The invention will now be further described with reference to the following examples. In the following examples it should be noted that the adhesives formed are all water based: where the word solution is used, this refers to a solution in water, and where the word emulsion is used, this refers to a dispersion of the polymers in water. It will be appreciated that the emulsions described in this specification may also include an amount (typically 0.5 wt % to 2 wt % of an emulsifying agent).

EXAMPLE 1

A vertical kettle mixer fitted with an anchor stirrer was charged with 270 g of an emulsion of a vinyl acetate ethylene co-polymer of 50% non-volatiles Mwt of greater than 200,000 and Tg of 0° C. To this was added with stirring 10 g of a 20% solution of a nonyl phenyl ethoxylate, 1 g of a biocide of the benzyl thioxazilone type, and the pH was then raised to 9 by the addition of an ammonia solution of SG 0.91. To this was added 630 g of a synthetic cis 1,4-polyisoprene, 4 g of a hindered phenol type antioxidant and 1 g of a mineral oil antifoam. To this mix was then added 2 g of a thickening agent of the polyvinylpyrrolidone type and 77 g of water. Stirring was then continued for a further 15 minutes to ensure a homogenous mix.

The viscosity of the resultant mix was measured at 25° C. using a BS4 flow cup and found to be 25 seconds; the non-volatile percentage was found to be 51%.

The adhesive was then coated on to a series of untreated films commonly used in the industry using a meyer bar at a coat weight of approximately 2.3 g/m$^2$. Seal strengths were then measured by peeling at 900 at a jaw separation rate of 300 mm/minute using a Monsanto T10Tensometer.

As a control, a commercial cold seal based on natural rubber latex was also prepared and tested in the same way. The results are shown in Table 1.

TABLE 1

| Film Type | Seal Strength N/25 mm Synthetic Cold Seal | Seal Strength N/25 mm Commercial Cold Seal |
| --- | --- | --- |
| GND | 2.7 | 2.5 |
| MW 647 | 2.8 | 2.6 |
| SHM | 3 | 1.9 |
| MW 247 | 3.2 | 2.8 |

GND is a biaxially oriented polypropylene (BOPP) coextruded film
MW 647 is a BOPP acrylic coated both sides
SHM is a metallised coextruded OPP film
MW 247 is a BOPP film The results show an improvement in adhesion using a totally synthetic cold seal.

A commercial trial was then carried out on untreated SHD film using a commercial printing press employing the forward gravure process at a coat weight of approximately 4 g/m² dry. Seal strengths were then measured after sealing at ambient temperature at 40 psi (276 kPa) and peeling at 90° at a jaw separation rate of 300 mm/minute using a Monsanto T10 Tensometer and found to give 3.7 N/25 mm with cohesive failure.

Blocking tests were then carried out. The coatings were blocked against a polyamide release lacquer supplied by Siegwerk at a pressure of 5 tons (5080 kg) for 72 hours at 25° C. The cold seal coated SHD film was then peeled from the release lacquer using a Monsanto T 10 tensometer at a jaw separation rate of 300 mm/min. The resultant cling value was measured as 0.34 N/25 mm. Additionally peel tests were carried out on the cold seal after it had been blocked under the above conditions and seal values of 3.75 N/25 mm were recorded showing that no release lacquer was removed by the adhesive during blocking.

EXAMPLE 2

A vertical kettle mixer fitted with an anchor stirrer was charged with 300 g of a styrene acrylic emulsion of 50% non volatiles Mwt of greater than 200,000 and Tg of 4° C. To this was added with stirring 10 g of a 20% solution of a nonyl phenyl ethoxylate, 1 g of a biocide of the benzyl thioxazilone type, and the pH was then raised to 9 by the addition of an ammonia solution of SG 0.91. To this was added 700 g of the synthetic cis-1,4-polyisoprene latex, then 4 g of a hindered phenol type antioxidant. Stirring was then continued for a further 15 minutes to ensure a homogenous mix.

The viscosity of the resultant mix was measured at 25° C. using a BS4 flow cup and found to be 25 seconds; the non volatile percentage was found to be 56% and the pH was determined as 10. The adhesive was then coated onto SHD film at a coat weight of approximately 2.5 g using a Meyer Bar. Blocking tests were then carried out at 10 tons (10160 kg) pressure for 18 hours at 25° C. against a variety of release lacquers with the results shown in Table 2.

TABLE 2

| Release Lacquer | Cling Value N/25 mm |
| --- | --- |
| Sun VHL 478914 | 0.13 |
| Coates 10685 | 0.13 |
| Sicpa 994190 | 0.09 |
| Untreated OPP | 1.46 |

The adhesive was then coated on to a series of untreated films commonly used in the industry using a meyer bar at a coat weight of approximately 2.5 g/m². Seal strengths were then measured by peeling at 900 at a jaw separation rate of 300 mm/minute using a Monsanto T10 Tensometer with the results shown in Table 3.

TABLE 3

| Film Type | Seal Strength N/25 mm |
| --- | --- |
| GND | 3.8 |
| MW 647 | 2 |
| SHM | 3.2 |

EXAMPLE 3

A vertical kettle mixer fitted with an anchor stirrer was charged with 298 g of a styrene acrylic emulsion of 50% non volatiles Mwt of greater than 200,000 and Tg of 4° C. To this was added with stirring 1 g of a biocide of the benzyl thioxazilone type and 5 g of a hindered phenol type antioxidant. To this was added 447 g of a styrene butadiene rubber latex of 66% non volatiles and Tg of –50° C. To this was added 249 g of the synthetic cis-1,4-polyisoprene. Stirring was then continued for a further 15 minutes to ensure a homogeneous mix.

The viscosity of the resultant mix was measured at 25° C. using a BS4 flow cup and found to be 28 seconds, the non volatile percentage was found to be 59% and the pH was determined as 9. The adhesive was then coated onto medical paper and untreated films commonly used in the industry at a coating weight of approximately 4.0 g/m² using a Meyer Bar. Seal strengths were then measured by peeling at 900 at a jaw separation rate of 300 mm/min using a Monsanto T10 Tensometer with the results shown in Table 4.

TABLE 4

| Film/Paper Type | Seal Strength N/25 mm |
| --- | --- |
| Medical Paper | 5.50 |
| SHD | 4.50 |
| GND | 4.35 |

Blocking tests were carried out at 10 tons (10160 kg) pressure for 18 hours at 25° C. against a release lacquer from Siegwerk 10-611021/6 with the results shown in Table 5.

TABLE 5

| Film Type | Cling Value N/25 mm |
| --- | --- |
| SHD | 0.16 |
| GND | 0.19 |

EXAMPLE 4

A vertical kettle mixer fitted with an anchor stirrer was charged with 97 g of a styrene acrylic emulsion of 50% Non volatiles Mwt of greater than 200,000 and Tg of 4° C. and 145 g of a further styrene acrylic emulsion of Mwt. 230,000 and Tg of –5° C. To this was added with stirring 1 g of a biocide of the benzyl thioxazilone type, 2 g of a hindered phenol type antioxidant, 10 g of a 20% solution of a nonyl phenyl ethoxylate. 310 g of an emulsion of a 2,3-dichloro-1,3-butadiene rubber with a Tg of –40° C. was then added and 435 g of the synthetic cis 1,4 polyisoprene latex,. Stirring was then continued for a further 15 minutes to ensure a homogenous mix.

The viscosity of the resultant mix was measured at 25° C. using a BS4 flow cup and found to be 20 seconds, non volatile percentage was found to be 55% and the pH determined as 9.5. The adhesive was then coated onto plastic films at a coat weight of approximately 3 gsm using a Meyer Bar and seal strengths measured. The results are shown in Table 6.

TABLE 6

| Film Type | Seal Strength N/25 mm synthetic cold seal |
| --- | --- |
| SHD 40 | 3.85 |
| Brithene B32 | 4.90 |

Whilst certain preferred embodiments of the invention have been described above, it will be appreciated that the invention may be modified within the spirit and scope of the appended claims.

We claim:

1. An adhesive emulsion composition comprising:
   a) from about 10 to about 74 wt % of synthetic cis-1,4-polyisoprene;
   b) from about 0.4 to about 60 wt % of a further synthetic polymer comprising one or more polymers selected from the group consisting of the type based on: acrylic monomers; vinyl acetate monomers; copolymers of acrylics; copolymers containing vinyl acetate; chlorinated rubbers; and mixtures thereof, selected such that the composition has improved adhesion to polymer films and has improved block resistance in comparison with an adhesive not Including said further synthetic polymer;
   c) from about 0.05 to about 0.3 wt % of an emulsion stabilizer; and
   d) water.

2. The adhesive emulsion composition according to claim 1, wherein the synthetic cis-1,4-polyisoprene has a molecular weight in the range of 2,000,000 to 3,000,000.

3. The adhesive emulsion composition according to claim 1, wherein the synthetic cis-1,4-polyisoprene has a substantially zero gel content.

4. The adhesive emulsion composition according to claim 1, wherein the synthetic cis-1,4-polyisoprene is provided In an emulsion containing from about 60 wt % to about 70 wt % synthetic cis-1,4-polyisoprene in water.

5. The adhesive emulsion composition according to claim 1, wherein the further synthetic polymer Is provided In an emulsion containing from about 50 wt % to about 55 wt % of the further synthetic polymer in water.

6. The adhesive emulsion composition according to claim 1, comprising from about 60 to about 80 wt % of synthetic cis-1,4-polyIsoprene in combination with about 20 to about 40 wt % of the synthetic polymer.

7. The adhesive emulsion composition according to claim 1, wherein a glass transition temperature of the further synthetic polymer is from about −20° C. to about +20° C.

8. The adhesive emulsion composition according to claim 7, wherein the glass transition temperature of the further synthetic polymer is from about −10° C. to about +5° C.

9. The adhesive emulsion composition according to claim 1, further comprising up to about 30 wt % of an emulsion of a tackifying resin in water.

10. The adhesive emulsion composition according to claim 1, wherein the stabiliser comprises nonyl phenyl ethoxylate having from 30 to 70 moles ethylene oxide.

11. The adhesive emulsion composition according to claim 1, wherein the synthetic cis-1,4-polyisoprene has a limiting viscosity number, as measured by Shell's method SMS 2195, in the range of 6.5 to 9.0 dl/g, the Mooney viscosity of the synthetic cis-1,4-polyisoprene, as measured by ASTM D1646, is in the range of 70 to 80 MU, and the synthetic cis-1,4-polyisoprene has substantially zero branching.

12. The adhesive emulsion composition according to claim 1, wherein the adhesive emulsion composition comprises substantially no natural cis-1,4-polyIsoprene.

13. An adhesive emulsion according to claim 1, further comprising a rubber selected from the group consisting of: styrene-butadiene, styrene-isoprene, and mixtures thereof.

14. A method of coating a substrate of a packaging structure comprising the steps of:
   forming a layer of adhesive along a side of the substrate wherein the adhesive comprises an emulsion comprising from about 10 to about 74 wt % of synthetic cis-1,4-polyisoprene; from about 0.5 to about 60 wt % of further synthetic polymer being selected such that the composition has improved adhesion to polymer substrates and has improved block resistance in comparison with an adhesive not including said further synthetic polymer; and water.

15. The method according to claim 14, wherein said further synthetic polymer comprises one or more of a polymers selected from the group of the type based on: acrylic monomers; vinyl acetate monomers; copolymers of acrylics; copolymers containing vinyl acetate; chlorinated rubbers; and mixtures thereof.

16. The method according to claim 14, wherein said emulsion comprises substantially no natural cis-1,4-polyisoprene.

17. The method according to claim 14, wherein said synthetic cis-1,4-polyisoprene has a molecular weight in the range of 2,000,00to 3,000,00.

18. The method according to claim 14, wherein said synthetic cis-1,4-polyisoprene has a substantially zero gel content.

19. The method according to claim 14, wherein said synthetic cis-1,4-polyisoprene is provided in an emulsion containing from about 60 wt % to about 70 wt % synthetic cis-1,4-polyisoprene in water.

20. The method according to claim 14, wherein said further synthetic polymer is provided in an emulsion containing from about 50 wt % to about 65 wt % of said further synthetic polymer in water.

21. The method according to claim 14, wherein said emulsion comprises from about 60 to about 80 wt % synthetic cis-1,4-polyisoprene and from about 20 to about 40 wt % of the synthetic polymer.

22. The method according to claim 14, wherein said further synthetic polymer has a glass transition temperature from about −20° C. to about +20° C.

23. The method according to claim 22, wherein said further synthetic polymer has a glass transition temperature from about −10° C. to about +5° C.

24. The method according to claim 14, wherein said emulsion further comprises up to about 30 wt % of a tacloying resin.

25. The method according to claim 14, wherein said emulsion further comprises a stabilizer comprising nonyl phenyl ethoxylate having from 30 to 70 moles ethylene oxide.

26. The method according to claim 14, wherein said synthetic cis-1,4-polyisoprene has a limiting viscosity number, as measured by Shell's method SMS 2195, in the range of 6.5 to 9.0 dl/g, the Mooney viscosity of the synthetic cis-1,4-polyisoprene, as measured by ASTM D1646, is in the range of 70 to 80 MU, and the synthetic cis-1,4-polyisoprene has substantially zero branching.

27. A method of adhering substrates by coldsealing comprising the steps of:
   forming a layer of adhesive along a side of a first substrate and a side of a second substrate, wherein the adhesive comprises an emulsion comprising from about 10 to about 74 wt % of synthetic cis-1,4-polyisoprene; from about 0.4 to about 60 wt % of further synthetic polymer being selected such that the composition has improved adhesion to polymer substrates and has improved block resistance in comparison with an adhesive not Including said further synthetic polymer; and water; and
   contacting said side of a first substrate having a layer of adhesive and said side of a second substrate having a layer of adhesive under pressure, wherein each of said layers of adhesive are sealed to one another.

* * * * *

UNITED STATES PATENT AND TRADEMARK OFFICE
CERTIFICATE OF CORRECTION

PATENT NO. : 6,613,831 B1
DATED : September 2, 2003
INVENTOR(S) : Christine Bentley and Brian William Stephenson It is certified that error appears in the above-identified patent and that said Letters Patent is hereby corrected as shown below:

Column 9,
Line 8, "polyner" should be changed to -- polymer --
Line 36, "polylsoprene" should be changed to -- polyisoprene --

Column 10,
Line 26, "65" should be changed to -- 55 --
Line 39, "tacloying" should be changed to -- tackifying --

Signed and Sealed this

Sixteenth Day of December, 2003

JAMES E. ROGAN
*Director of the United States Patent and Trademark Office*